United States Patent
Fokema et al.

(10) Patent No.: US 12,257,553 B2
(45) Date of Patent: Mar. 25, 2025

(54) SEPARATION MEMBRANE AND METHODS OF PREPARATION THEREOF

(71) Applicant: Aspen Products Group, Inc., Marlborough, MA (US)

(72) Inventors: Mark D. Fokema, Northborough, MA (US); Decio Coutinho, Marlborough, MA (US)

(73) Assignee: Aspen Products Group, Inc., Marlborough, MA (US)

( * ) Notice: Subject to any disclaimer, the term of this patent is extended or adjusted under 35 U.S.C. 154(b) by 45 days.

(21) Appl. No.: 17/303,363

(22) Filed: May 27, 2021

(65) Prior Publication Data
US 2022/0032240 A1    Feb. 3, 2022

Related U.S. Application Data (60) Provisional application No. 63/057,939, filed on Jul. 29, 2020.

(51) Int. Cl.
*B01D 67/00* (2006.01)
*B01D 61/36* (2006.01)
(Continued)

(52) U.S. Cl.
CPC ....... *B01D 67/0039* (2013.01); *B01D 61/363* (2022.08); *B01D 67/00791* (2022.08);
(Continued)

(58) Field of Classification Search
None
See application file for complete search history.

(56) References Cited

U.S. PATENT DOCUMENTS

| 4,456,708 A | * | 6/1984 | Wydeven | B01D 69/02 521/142 |
| 6,536,604 B1 | * | 3/2003 | Brinker | B01D 71/027 210/500.25 |

(Continued)

FOREIGN PATENT DOCUMENTS

| WO | 2010111755 A2 | 10/2010 |
| WO | 2020201914 A1 | 10/2020 |

OTHER PUBLICATIONS

Shahin Homaeigohar, et al., "Graphene Membranes for Water Desalination," 9 NPG Asia Materials e427 (1-16) (Aug. 25, 2017).

(Continued)

*Primary Examiner* — Jason M Greene
*Assistant Examiner* — Erin J McCullough
(74) *Attorney, Agent, or Firm* — Modern Times Legal; Robert J. Sayre (57) ABSTRACT

A membrane for fluid species transport includes a porous substrate and a selective-transport layer comprising 2-D-material flakes. The porous substrate defines surface pores with dimensions larger than 2 microns, and the selective-transport layer coats the porous substrate and spans across the surface pores. The porous substrate can be contacted with a liquid or coating to fill or coat the surface pores of the porous substrate. Next, a 2-D-material-flake solution is deposited on the porous substrate. Evaporation of solvent from the deposited 2-D-material-flake solution forms the selective-transport layer.

6 Claims, 5 Drawing Sheets

(51) Int. Cl.
*B01D 69/02* (2006.01)
*B01D 69/12* (2006.01)
*B01D 69/14* (2006.01)
*B01D 71/02* (2006.01)
*B01D 71/48* (2006.01)

(52) U.S. Cl.
CPC ..... *B01D 67/0088* (2013.01); *B01D 67/0095* (2013.01); *B01D 69/02* (2013.01); *B01D 69/12* (2013.01); *B01D 69/125* (2013.01); *B01D 69/148* (2013.01); *B01D 71/02* (2013.01); *B01D 71/0211* (2022.08); *B01D 71/024* (2013.01); *B01D 71/48* (2013.01); *B01D 2323/04* (2013.01); *B01D 2323/081* (2022.08); *B01D 2323/14* (2013.01); *B01D 2323/28* (2013.01); *B01D 2323/36* (2013.01); *B01D 2323/46* (2013.01); *B01D 2325/04* (2013.01); *B01D 2325/20* (2013.01)

(56) References Cited

U.S. PATENT DOCUMENTS

| | | | |
|---|---|---|---|
| 9,517,433 | B2 | 12/2016 | Huizing et al. |
| 10,124,299 | B2 | 11/2018 | Kim et al. |
| 10,245,557 | B2 | 4/2019 | Jhon et al. |
| 10,272,392 | B2 | 4/2019 | Chu et al. |
| 2011/0059871 | A1 | 3/2011 | Tour et al. |
| 2012/0208004 | A1* | 8/2012 | Wolcott ............... B01D 69/105 427/244 |
| 2013/0287937 | A1* | 10/2013 | Joo ..................... H01M 50/417 427/126.3 |
| 2014/0069277 | A1 | 3/2014 | Choi et al. |
| 2014/0086810 | A1* | 3/2014 | Everhart ................ B01D 53/88 29/458 |
| 2014/0305863 | A1* | 10/2014 | Van Engelen ....... B01D 69/125 427/508 |
| 2015/0076109 | A1 | 3/2015 | Baklanov |
| 2015/0258506 | A1* | 9/2015 | Mi ....................... B01D 71/021 156/273.1 |
| 2016/0310908 | A1 | 10/2016 | Yu |
| 2016/0354729 | A1* | 12/2016 | Krishna ................. B01D 71/56 |
| 2017/0113191 | A1 | 4/2017 | Lai et al. |
| 2017/0368508 | A1* | 12/2017 | Grossman ............... C02F 1/442 |
| 2018/0071692 | A1 | 3/2018 | Nair et al. |
| 2018/0133659 | A1 | 5/2018 | Bhave et al. |
| 2018/0141006 | A1* | 5/2018 | Van Gestel .......... B01D 71/024 |
| 2018/0326359 | A1* | 11/2018 | Fokema .................... B32B 1/00 |
| 2020/0017377 | A1 | 1/2020 | Zheng |
| 2020/0164318 | A1 | 5/2020 | Prince et al. |

OTHER PUBLICATIONS

Omnya Abdalla, et al., "Fabrication of Graphene Oxide-Based Membranes and their Applications in Water Treatment," 22 Current Pharmaceutical Biotechnology, 1686-1704 (Oct. 20, 2020).

Ohchan Kwon, et al., "Fabrication Techniques for Graphene Oxide-Based Molecular Separation Membranes: Towards Industrial Application," 11 Nanomaterials 757 (1-14) (Mar. 17, 2021).

Shuang Zhao, et al., "Design and Fabrication of Highly Selective and Permeable Polymer Membranes," 128 J. Appl. Phys. 131102 (Oct. 7, 2020).

Lina Nie, et al., "Realizing Small-Flake Graphene Oxide Membranes for Ultrafast Size-Dependent Organic Solvent Nanofiltration," 6 Sci. Adv. eaaz9184 (1-12) (Apr. 24, 2020).

Albert Boretti, et al., "Outlook for Graphene-Based Desalination Membranes," 1 npj Clean Water 1-11 (May 24, 2018).

Hanaa M. Hegab, et al., "Graphene Oxide-Assisted Membranes: Fabrication and Potential Applications in Desalination and Water Purification," 484 J. Mem. Sci. 95-106 (2015).

Seungju Kim, et al. "2D Nanosheets and Their Composite Membranes for Water, Gas, and Ion Separation," 58 Angew Chem. Int. Ed. 17512-17527 (Feb. 27, 2019).

L. Zhang, "Numerical Study of Heat and Mass Transfer in an Enthalpy Exchanger with a Hydrophobic-Hydrophilic Composite Membrane Core," 51 Numerical Heat Transfer: Part A, 697-714 (Mar. 30, 2007).

Hirose Paper Manufacturing Co., Brochure for SAMPE 2013 << available at http://www.hiroseamerica.com/wp-content/uploads/2013/05/Brochure-for-SAMPE-2013.pdf>> (2013).

United States Patent and Trademark Office, International Search Report and Written Opinion for PCT/US21/70622 (corresponding PCT application) (Aug. 6, 2021).

\* cited by examiner

SEPARATION MEMBRANE AND METHODS OF PREPARATION THEREOF

RELATED APPLICATION

This application claims the benefit of U.S. Provisional Application No. 63/057,939, filed 29 Jul. 2020, the entire content of which is incorporated herein by reference.

GOVERNMENT SUPPORT

This invention was made with government support under award number DE-SC0017783 awarded by the United States Department of Energy. The US government has certain rights in the invention.

BACKGROUND

The present disclosure relates to a separation membrane and a method of preparing the same. The separation membrane provides the ability to rapidly permeate select components from a fluid stream on one side of the membrane to a fluid stream on the other side of the membrane, while simultaneously minimizing the transport of other undesired gaseous or liquid components across the membrane, thereby producing purified fluid streams in which the select component is either enriched or depleted. Transport across the separation membrane is driven by an energy differential between the two fluid streams that may arise from fugacity, activity, concentration, pressure, temperature, and electric potential gradients. Separation membranes have been utilized in a variety of membrane processes, such as reverse osmosis, forward osmosis, nanofiltration, microfiltration, dialysis, electrodialysis, pervaporation, gas separation, membrane contactors, membrane distillation, and membrane reactors, among others.

Separation membranes may generally be classified as porous membranes or non-porous membranes. The movement of components through porous membrane structures may be affected by the relative dimensions of the components and those of the pores, and/or by an affinity that the components have for adsorbing to the surfaces of the pore walls, and/or by electrostatic or magnetic interactions between the components and the pore walls. Porous membranes may be symmetric, wherein the pore dimensions remain relatively consistent across the thickness of the membrane, or they may be asymmetric, wherein the pore dimensions change across the thickness of the membrane.

Non-porous membranes generally achieve separation via a solution-diffusion process, wherein the component first dissolves in the membrane matrix, followed by diffusion through the continuous matrix phase. The permeability of this membrane may be expressed as the product of the solubility and the diffusivity of the component within the membrane matrix. Liquid membranes are a specialized type of non-porous membrane in which component transport is enhanced by mobile carriers within the liquid phase that have an affinity for associating with the desired component.

Both porous and non-porous membranes may be constructed from composite or non-composite structures. A composite structure generally comprises two or more layers of distinct compositions, whereas a non-composite structure generally comprises a single layer. Many commercially applied separation membranes are composite structures, comprising two, three, or more distinct layers that each play a critical role in membrane function. For instance, many reverse-osmosis membranes are known as "thin-film composites" and comprise the following three layers: a non-woven polymeric fiber base that imparts mechanical strength to the membrane, an intermediary microporous polymeric layer that fills the pores of the non-woven base, and a thin polyamide coating that covers the top surface of the microporous layer. Without the active polyamide coating, the membrane would likely exhibit no selectivity towards salt removal. Without the microporous polymer layer, the polyamide would likely not form a continuous leak-proof active coating. Without the non-woven base, the membrane would likely be too weak to withstand membrane-module fabrication and operating processes.

Composite membrane structures are commonly employed in an effort to minimize the thickness of the active separation layer. The active separation layer typically exhibits a characteristic component permeability (mol/s/m/Pa). By reducing the thickness of the active separation layer, the component permeance (mol/s/m$^2$/Pa) may be increased, which directly increases membrane flux (mol/s/m$^2$). Increased membrane flux yields separation processes with reduced membrane surface areas and costs.

As the thickness of the active separation layer is reduced, the properties of the underlying microporous polymeric layer become more critical to proper membrane function. Large pores or defects present in the microporous layer can compromise the ability of the thinner active separation layer to span the pores or defects without realizing defects in the active separation layer. Defects in the active separation layer allow undesired gaseous or liquid components across the membrane, thereby reducing the permselectivity of the membrane and impairing overall membrane function. Even in instances where the active separation layer is able to span the large pores or defects without realizing defects in the active separation layer, penetration of the separation layer coating into pores within the microporous polymer layer structure can result in localized thickening of the active separation layer, which reduces component permeance and flux through the membrane.

A variety of materials that possess a two-dimensional (2-D) microstructure (i.e., materials with sheet- or plate-like morphologies that are from one to five atoms thick) have been shown to be an effective water-transport medium, including graphene oxide, boron nitride and transition-metal chalcogenides, such as molybdenum sulfide and tungsten sulfide. Graphene oxide, in particular, has been shown to be an effective membrane for certain aqueous separations. Permselectivity has generally been accomplished by generating atomic-scale pores in the 2-D sheet or making use of the interlamellar spacing between stacked sheets as a conduit for transport. In the latter case, permselectivity can be achieved through functionalization of the 2-D sheet surfaces and control of the interlamellar spacing. Graphene oxide has been shown to possess a unique ability to selectively transport water relative to less hydrophilic and larger atoms, ions, and molecules at extremely high rates. The high water permeability and permselectivity of graphene oxide has been attributed to the ability of portions of its oxidized surface, including epoxy, hydroxyl, carbonyl, and carboxyl functionalities, to hydrogen bond with water molecules and promote an interlamellar spacing large enough for individual sheets of water molecules to pass through along the graphitic regions in a near frictionless manner, while preventing the passage of larger ions and molecules. Neutron scattering and x-ray diffraction measurements have shown that while dry graphene oxide prepared via the Hummer's method exhibits an interlamellar spacing of ~6 Å, it can swell to as high as ~11 Å in the presence of water, providing space for one or two monolayers of water within the interlamellar region.

Moisture-permeable membranes including 2-D material active layers may exhibit high moisture permeances not only because the 2-D material possesses a high moisture permeability, but also because the 2-D material can be formed into a thin-layered structure. In many instances, the active 2-D separation layer may be less than 1-micron thick, but the 2-D layer may also be only several nanometers thick (equivalent to several atomic layers thick). In order to realize these 2-D layer thicknesses, the 2-D layer is generally supported on a porous substrate to form a composite membrane structure with adequate strength to withstand membrane fabrication and operation conditions.

Although the moisture permeance of membranes including 2-D materials generally increases as the 2-D layer thickness decreases, it becomes more difficult to maintain a contiguous, defect-free, permselective 2-D layer as the 2-D layer thickness decreases. Thus, membrane permselectivity often decreases while the membrane permeance increases as the 2-D layer thickness decreases.

The microstructure of the substrate on which the 2-D material is supported plays an important role in determining the transport properties of composite membranes including 2-D active separation layers. Although the inherently high aspect ratios of 2-D crystals enable them to better span defects and pores in the substrate compared to traditional polymer coatings, there is still a limiting pore size, above which, 2-D materials deposited from coating solutions or suspensions (as used herein, the term, "solution," is used interchangeably with "suspension" and includes 2D-material suspensions) do not effectively span the defect/pore, thereby producing a leaky, low-permselectivity membrane. US Patent Application Pub. No. 2011/0059871 A1 discloses that graphene oxide in solution is retained on polyethersulfone membranes with 0.22-um pore size, but readily passes through 0.45-um-pore polyethersulfone membranes and 2.7-micron-pore cotton linter membranes. Other references (e.g., US 2018/0141006 A1, US 2018/0071692 A1, US 2017/0113191 A1, US 2016/0310908 A1, US 2014/0069277 A1) describe forming permselective graphene-oxide coatings on polymeric and ceramic membrane supports with pore dimensions restricted to between 0.002 and 0.45 um.

The use of microporous supports with sub-micron-sized pores to support the deposition of defect-free moisture-permselective coatings adversely impacts overall membrane permeance and cost. L. Zhang ("Numerical Study of Heat and Mass Transfer in an Enthalpy Exchanger with a Hydrophobic-Hydrophilic Composite Membrane Core," 51 Numerical Heat Transfer: Part A, 697-714 (30 Mar. 2007)] describes a composite moisture-permeable membrane in which 88% of the overall moisture-transport resistance is attributed to the 100-micron-thick porous substrate layer. U.S. Pat. No. 9,517,433 describes composite membranes with 50-250-micron-thick porous supports in which more than 50% of the water-vapor transport resistance is attributed to the substrate, which includes numerous tortuous and dead-ended pores. U.S. Pat. No. 9,517,433 also describes a composite moisture-permeable membrane, wherein 80% of the membrane cost is attributable to the microporous substrate layer. As the active-membrane layer thickness and cost are reduced, the contribution that the microporous-support layer makes to overall membrane transport resistance and cost further increases.

A vapor-permeable composite membrane that foregoes the use of a microporous substrate offers the potential for significantly greater moisture permeances and reduced membrane costs.

SUMMARY

Described herein are highly permeable, composite-structured, vapor-transport membranes and processes for the production thereof.

A membrane for fluid species transport includes a porous substrate and a selective-transport layer comprising 2-D-material flakes. The porous substrate defines surface pores with dimensions larger than 2 microns, and the selective-transport layer coats the porous substrate and spans across the surface pores.

The selective-transport layer can be formed by contacting the porous substrate with a liquid or coating to fill or coat the surface pores of the porous substrate. Next, a 2-D-material-flake solution is deposited on the substrate. Evaporation of solvent from the deposited 2-D-material-flake solution then forms the selective-transport layer.

The two-layer composite membranes comprise a thin selective transport layer located directly upon a low-cost, macroporous substrate. The membranes do not employ a microporous or nanofibrous support layer, thereby eliminating microporous-support vapor-transport resistance and reducing membrane-production costs.

In various exemplifications, the membranes and the fabrication thereof can be characterized by any of the following or by combination thereof. The 2-D-material-flake-solution layer can have a thickness of less than 25 microns or even less than 15 microns. The porous substrate can define surface pores with dimensions larger than 5 microns, larger than 20 microns, larger than 40 microns, larger than 100 microns, or even larger than 200 microns. The porous substrate can exhibit an air permeance greater than 20,000,000 GPU; greater than 100,000,000 GPU; greater than 500,000,000 GPU; or even greater than 2,000,000,000 GPU. The 2-D-material flakes can have a mean lateral dimension smaller than 10 microns, smaller than 4 microns, smaller than 2 microns, smaller than 1 micron, or even smaller than 0.5 microns. The ratio of porous-substrate surface-pore dimensions to mean flake lateral dimension can be at least 2:1, at least 4:1, at least 10:1, at least 20:1, at least 40:1, or even at least 100:1. The selective-transport layer can be less than 2-microns thick, less than 0.5-micron thick, less than 0.2-microns thick, less than 0.04-microns thick, less than 0.01-microns thick, or even less than 0.004-microns thick. The ratio of porous-substrate surface-pore dimensions to selective-transport-layer thickness can be at least 200:1, at least 400:1, at least 1,000:1, at least 2,000:1, at least 4,000:1, or even at least 10,000:1. The selective-transport layer can comprise at least 50-mass-percent 2-D material, at least 80-mass-percent 2-D material, at least 95-mass-percent 2-D material, or even at least 99-mass-percent 2-D material.

Embodiments of the membrane can be formed by depositing a liquid within the pores of a macroporous fibrous substrate to produce a "pore-filled" support. A coating solution, comprising a 2-D material dissolved in a solvent, is then metered onto the surface of the pore-filled support at a prescribed coating thickness. The solvent is then removed from the 2-D-solution coating to produce a thin 2-D-coating layer upon the pore-filled support. The liquid is then removed from the pore-filled support to produce the membrane, comprising a thin 2-D-material film supported on a fibrous substrate.

Other embodiments of the membrane can be formed by depositing an amphiphilic coating onto the pore-filled support prior to metering the 2-D-material solution onto the pore-filled support at a prescribed coating thickness. The amphiphilic coating can improve the wettability of the 2-D-material solution on the pore-filled support. After the solvent is removed from the 2-D-solution coating to produce a thin 2-D-coating layer upon the pore-filled support, the liquid and amphiphilic coating are then removed from the support to produce the membrane, comprising a thin 2-D-material film supported on a fibrous substrate.

Other embodiments of the membrane can be formed by depositing ionic species onto the surface of a macroporous fibrous substrate to produce a "surface-charge-modified" support. A coating solution, comprising a 2-D material dissolved in a solvent, is then metered onto the surface of the surface-charge-modified support at a prescribed coating thickness. The solvent is then removed from the 2-D-solution coating to produce a thin 2-D-coating layer upon the surface-charge-modified support. The ionic species can then be removed from the support to produce the membrane, comprising a thin 2-D-material film supported on a fibrous substrate. Alternatively, the ionic species can be left in the support, if the presence of the ionic species does not adversely affect the performance of the membrane.

The membranes can be employed in a variety of commercial gas-separation applications, including $O_2$ and $N_2$ separation from air, $CO_2$ removal from air and natural gas, $H_2$ separation from nitrogen, syngas and hydrocarbons, $C_2$ and $C_3$ paraffin and olefin separation from nitrogen, $H_2S$ removal from hydrocarbons, volatile organic carbon (VOC) removal from air, and $H_2O$ removal from air and hydrocarbons.

In particular embodiments, the membranes are directed to humidity-management applications, as they facilitate rapid transport of water from a water-vapor-rich stream to a water-vapor-poor stream, while minimizing transport of other gases and liquids across the membrane and resisting membrane fouling and degradation. In other embodiments, the membranes are directed to pervaporation and membrane-contactor applications, as they facilitate rapid transport of water between liquid and gas streams, while minimizing transport of other gases and liquids across the membrane and resisting membrane fouling and degradation.

The membranes of this disclosure can be employed to reduce the cost and improve the performance (e.g., in terms of exhibiting higher vapor permeance) of vapor-transport systems. These and other advantages and attainments of embodiments of the present invention will become apparent to those skilled in the art upon a reading of the following detailed description and illustrative embodiment of the invention.

The removal of moisture from fluid streams (dehydration) or the transfer of moisture between fluid streams (humidification/dehumidification) can be accomplished using the membranes. The membranes can be used in a variety of moisture transfer applications, including building wraps, solvent dehydration, fuel-cell feed humidification, and HVAC-system air humidification/dehumidification. In contrast with the membranes described herein, most traditional moisture-transfer membranes suffer from one or more of a variety of shortcomings, including 1) low moisture permeance (due to low membrane moisture permeability or thick active-membrane separation layers), 2) poor moisture permselectivity, 3) low strength, 4) poor stability (due to swelling/shrinking or solubilization of membrane components), 5) poor freeze-thaw tolerance, 6) high flammability, and 7) high cost.

BRIEF DESCRIPTION OF THE DRAWINGS

In the course of the following detailed description, reference will be made to the attached drawings in which.

The drawings are not necessarily to scale; instead, an emphasis is placed upon illustrating particular principles in the exemplifications discussed below.

DETAILED DESCRIPTION

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise herein defined, used or characterized, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially (though not perfectly) pure, as practical and imperfect realities may apply; e.g., the potential presence of at least trace impurities (e.g., at less than 1 or 2%) can be understood as being within the scope of the description. Likewise, if a particular shape is referenced, the shape is intended to include imperfect variations from ideal shapes, e.g., due to manufacturing tolerances. Percentages or concentrations expressed herein can be in terms of weight or volume. Processes, procedures and phenomena described below can occur at ambient pressure (e.g., about 50-120 kPa—for example, about 90-110 kPa) and temperature (e.g., −20 to 50° C.—for example, about 10-35° C.) unless otherwise specified.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments.

Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly.

Further still, in this disclosure, when an element is referred to as being "on," "connected to," "coupled to," "in contact with," etc., another element, it may be directly on, connected to, coupled to, or in contact with the other element or intervening elements may be present unless otherwise specified.

The terminology used herein is for the purpose of describing particular embodiments and is not intended to be limiting of exemplary embodiments. As used herein, singular forms, such as "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

The term, "2-D material," is used herein to designate organic or inorganic materials that exist in microscale sheet- or plate-like morphologies, wherein the sheets or plates are from one-to-five atoms thick.

The term, "flux," is used herein to designate the molar rate of flow of a permeating species across a membrane, usually in dimensions of moles per square meter per second.

The term, "permeance," is used herein to designate the ratio of the species flux to the species partial-pressure difference across the membrane, usually in dimensions of moles per square meter per second per Pascal, or alternatively in units of Gas Permeation Units (GPU), wherein 1 GPU equals $3.35 \times 10^{-10}$ mol m$^{-2}$ s$^{-1}$ Pa$^{-1}$.

The term, "permeability," is used herein to designate the product of the species flux and the membrane thickness, usually in dimensions of moles per meter per second per Pascal, or alternatively in units of Barrers, wherein 1 Barrer equals $3.35 \times 10^{-16}$ mol m$^{-1}$ s$^{-1}$ Pa$^{-1}$.

The term, "selectivity," is used herein to designate the ratio of the permeability of one species to the permeability of another species.

The term, "surfactant," is used herein to designate a compound that lowers the surface or interfacial tension between two liquids, a liquid and a solid, or a gas and a liquid. A surfactant is generally an amphiphilic compound that includes both hydrophilic and hydrophobic functional groups.

Now, referring to FIGS. 1-14, features and details of the membranes and methods of production are described. Particular embodiments are detailed, below, for the purpose of illustration and not as limitations of the invention.

Figure 1:
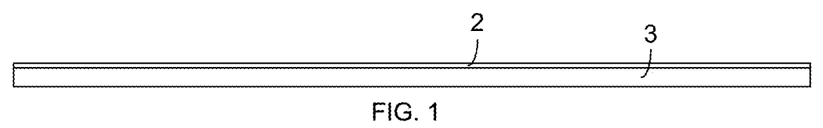
FIG. 1 is a side view of the membrane structure.
Figure 2:
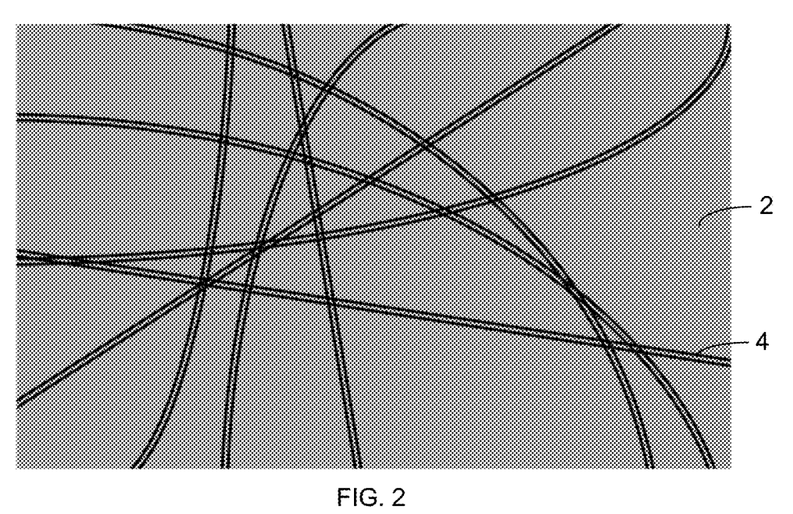
FIG. 2 is a top view of an exemplification of the membrane structure.
Figure 3:
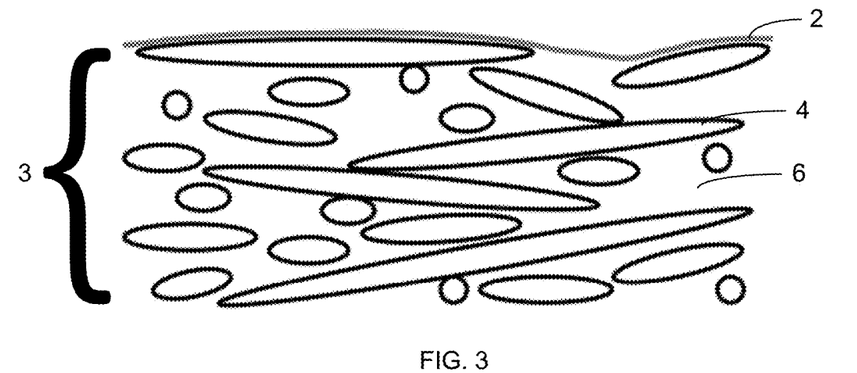
FIG. 3 is a side sectional view of an exemplification of the membrane structure.

FIGS. 1-3 are representations of a membrane comprising a thin selective-transport layer 2 positioned upon a low-cost, macroporous substrate 3 comprising fibers 4 and that is highly porous (including, for example, greater than 60% void space) and contains numerous large pores 6. The selective-transport layer 2 is a contiguous sheet that spans the pores 6 present between the fibers 4 along the surface of the macroporous substrate 3. The selective-transport layer 2 may be held to the fibers 4 via van der Waals forces, hydrogen bonding, ionic interactions, or covalent bonding.

The selective-transport layer 2 comprises at least one 2-D material, such as graphene; graphene oxide; silicene; 2-D silica; phosphorene; boron nitride; borocarbonitrides; transition metal chalcogenides, such as molybdenum sulfide and tungsten sulfide; and transition-metal carbides, nitrides, or carbonitrides (MXenes), that provide the ability to selectively transport one fluid species preferentially over another fluid species. Selective transport may arise due to steric, electronic, or magnetic interaction of the species with the 2-D-material sheets. The surface of the 2-D materials may also be functionalized with at least one organic ligand, such as sulfonic acid-, sulfonate-, carboxyl-, carboxylate-, quaternary ammonium-, pyridinium-, and amine-, in order to further enhance transport properties.

The selective-transport layer 2 is advantageously as thin as possible in order to maximize membrane permeance while still ensuring adequate layer integrity and strength. The selective-transport layer 2 is typically less than about 5 microns—e.g., less than about 2 microns, less than about 0.5 microns, less than about 0.2 microns, less than about 0.04 microns, less than about 0.01 microns, and, in more-particular embodiments, at least about 0.004 microns.

The selective-transport layer 2 may comprise 2-D materials with a range of mean 2-D-flake lateral dimensions (i.e., crystal dimensions along the face of the crystals)—for instance from about 0.5-micron-by-0.5-micron to about 5-micron-by-5-micron. Although use of a 2-D material possessing large mean lateral flake dimensions makes it easier to span the pores 6 of the fiber substrate, better membrane performance and lower membrane cost may be realized with smaller mean 2-D-flake lateral dimensions. 2-D-flake lateral dimensions are typically less than about 10-micron-by-10-micron—e.g., less than about 4-micron-by-4-micron, less than about 2-micron-by-2-micron, less than about 1-micron-by-1-micron, less than about 0.5-micron-by-0.5-micron, and in more-particular embodiments, at least about 0.2-micron-by-0.2-micron.

The macroporous substrate 3 comprising fibers 4 may be made of polymeric or non-polymeric materials. For example, polyethylene terephthalate (polyester), polyethylene, polypropylene, polybutylene, polyamides, and cellulose are commonly employed polymers for fibers, while glass, carbon and metal fibers may also be used. The substrate fibers may be woven or non-woven. Examples of non-woven polymeric substrates include those sold under the HOLLYTEX (from Ahlstrom-Munksjo of Helsinki, Finland), REEMAY (from Reemay, Inc., of Old Hickory, Tennessee, USA), NOVATEXX (from Freudenberg Filtration Technologies LP., of Hopkinsville, Kentucky, USA), and CRANEMAT (from Neenah Filtration of Pittsfield, Massachusetts, USA) trade names, among others.

In order to minimize the transport resistance of the membrane, the substrate 3 possesses an open, free-flowing structure with a large void fraction and numerous large pores with pore dimensions typically greater than about 1 micron—e.g., greater than about 2 microns, greater than about 5 microns, greater than about 10 microns, greater than about 20 microns, greater than about 40 microns, greater than about 100 microns, and, in more-particular embodiments, up to about 200 microns. The pores of the substrate 3 may be asymmetric or symmetric. The air permeance of the substrate 3 is typically about 5,000,000 to 50,000,000,000 GPU—e.g., about 20,000,000 to 10,000,000,000, about 50,000,000 to 2,000,000,000 GPU, and, in more-particular embodiments, about 100,000,000 to 800,000,000 GPU. The void fraction of the substrate 3 is typically about 0.4 to 0.9—e.g., about 0.5 to 0.8, and, in more-particular embodiments, about 0.55 to 0.75. The thickness of the substrate 3 is typically about 40 to 300 microns—e.g., about 60 to 200 microns, and, in more-particular embodiments, about 80 to 140 microns. The basis weight of the substrate 3 is typically about 20 to 150 g/m$^2$—e.g., about 40 to 100 g/m$^2$, and, in more-particular embodiments, about 50 to 80 g/m$^2$.

Use of Pore-Filling Agent

Figure 4:
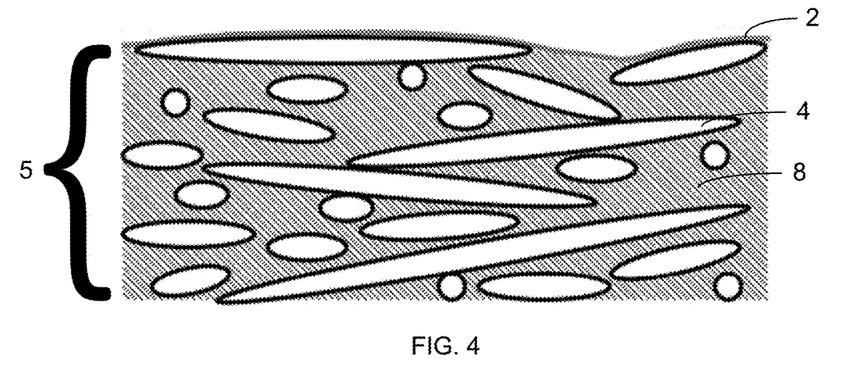
FIG. 4 is a side sectional view illustrating an exemplification of the membrane structure during preparation.

In order to deposit the selective-transport layer 2 so that it spans the pores 6 without excessively penetrating into the substrate 3, one option is to use a temporary or "fugitive" pore-filling agent 8 to synthesize the membranes. FIG. 4 shows a cross-sectional representation of a membrane during synthesis in which the pore-filling agent 8 wets and fills the pores of the substrate 3 (as shown in FIG. 3) up to the level of the top surface of the substrate 3 to form a pore-filled substrate 5. The presence of the pore-filling agent 8 prevents penetration of the selective-transport layer 2 into the substrate structure while the selective-transport layer 2 is being coated onto the pore-filled substrate 5.

The composition of the pore-filling agent 8 is dependent upon the composition of the substrate and of the solvent used to coat the 2-D material on the surface of the substrate. It is advantageous for the pore-filling agent 8 to readily wet the substrate, possess a suitable viscosity and surface tension in order to be retained within the substrate pores, and be insoluble/immiscible with the 2-D-material-coating-solution solvent. For ease of processing, the pore-filling agent 8 can possess a low vapor pressure and be readily removable from the substrate after the selective transport layer has been deposited on the pore-filled substrate.

A pore-filling agent 8 used with polymeric substrates and aqueous 2-D-material-coating solutions can exhibit specific physical characteristics. In order to ensure that the pore-filling agent 8 does not change phase during the coating process, the melting-point temperature of the pore-filling agent 8 is typically less than about 25° C.—e.g., less than about 20° C., and in more-particular embodiments, less than about 15° C. The boiling point temperature of the pore-filling agent 8 is typically greater than about 150° C.—e.g., greater than about 200° C., greater than about 250° C., greater than about 300° C., and in more-particular embodiments, greater than about 350° C.

In order to minimize losses of the pore-filling agent 8 to the surrounding air environment that would affect the location of the surface of the pore-filling agent 8 relative to the surface of the substrate 3 during the coating process, the vapor pressure of the pore-filling agent 8 is typically less than about 1 mmHg at 20° C.—e.g., less than about 0.1 mmHg at 20° C., less than about 0.01 mmHg at 20° C., less than about 0.001 mmHg at 20° C., and, in more-particular embodiments, less than about 0.0001 mmHg at 20° C.

In order to minimize losses of the pore-filling agent 8 from the pore-filled substrate 5 due to gravitationally induced bulk-fluid flow (i.e., dripping) that would affect the location of the surface of the pore-filling agent 8 relative to the surface of the substrate 3 during the coating process, the dynamic viscosity of the pore-filling agent 8 is typically greater than about 0.001 Pa s at 20° C.—e.g., greater than about 0.01 Pa s at 20° C., greater than about 0.1 Pa s at 20° C., and, in more-particular embodiments, greater than about 1 Pa s at 20° C.

In order to minimize material exchange between the pore-filled substrate 5 and the 2-D-material-coating solution, the solubility of the pore-filling agent 8 in the 2-D-material-coating-solution solvent (e.g., water) is typically less than about 0.1 g/L—e.g., less than about 0.01 g/L, less than about 0.001 g/L, less than about 0.0001 g/L, and, in more-particular embodiments, less than about 0.00001 g/L.

Suitable pore-filling agents 8 compatible with polymeric substrates 3 and an aqueous 2-D-material-coating solution include alkanes, such as decane, dodecane, tetradecane, hexadecane, and the like; alcohols, such as undecanol, dodecanol, 2-ethylhexanol, and the like; acids, such as octanoic acid, 9-octadecenoic acid, 9,12-octadecadienoic acid, and the like; aromatics, such as tetralin, 1-methylnaphthalene, indene, hexylbenzene, and the like; phthalates, such as dibutyl phthalate, bis(2-ethylhexyl) phthalate, and the like, among others.

Application of the pore-filling agent 8 to the fibrous substrate 3, can be accomplished through a variety of deposition methods, including dip coating, spray coating, gravure coating, slot-die coating, Mayer-rod coating, reverse-roll coating, and knife-over-roll coating, among others. It is advantageous for the pores of the fibrous substrate 3 to be completely filled with pore-filling agent 8 so that the surface of the pore-filling agent 8 is coincident with the surface of the fibrous substrate 3. The viscosity and surface-tension properties of the pore-filling agent 8 assist in retention of the pore-filling agent 8 within the open structure of the fibrous substrate 3 through subsequent coating processes.

The selective-transport layer 2 is formed by depositing a 2-D-material-coating solution upon the surface of the pore-filled substrate 5 at a prescribed coating-solution thickness, followed by evaporation of the coating-solution solvent. The thickness of the 2-D-material-coating solution is dependent upon the desired dried selective-transport layer 2 thickness (typically, less than about 5 microns—e.g., less than about 2 microns, less than about 0.5 microns, less than about 0.2 microns, less than about 0.04 microns, less than about 0.01 microns, and, in more-particular embodiments, less than about 0.004 microns) and upon the solids content of the 2-D-material-coating solution. The thickness of the 2-D-material-coating solution is typically less than about 100 microns—e.g., less than about 60 microns, less than about 40 microns, less than about 25 microns, and, in more-particular embodiments, less than about 15 microns.

Application of the 2-D-material-coating solution to the surface of the pore-filled substrate 5 can be accomplished through a variety of deposition methods, including dip coating, spray coating, gravure coating, slot-die coating, Mayer-rod coating, reverse-roll coating, and knife-over-roll coating, among others.

The 2-D-material-coating-solution solvent is advantageously a liquid in which the 2-D-material flakes readily dissolve or disperse. The solvent may comprise water, alcohols, alkanes, aromatics, ethers, aldehydes, ketones, other organic compounds, and mixtures thereof. The solids content of the 2-D-material-coating solution may be greater than about 0.1 mass percent—e.g., greater than about 0.5 mass percent, greater than about 1 mass percent, greater than about 2 mass percent, and in more-particular embodiments, greater than 5 mass percent.

It is advantageous for the 2-D-material-coating solution to readily wet the surface of the pore-filled substrate 5 in order to provide a continuous layer of the coating solution upon the surface of the pore-filled substrate. Where a pore-filling agent is used, wettability is governed by the surface tension of the pore-filling agent, the surface tension of the 2-D-material-coating solution, and the interfacial tension between the pore-filing agent and the solution. It is advantageous for the 2-D-material-coating solution to also have high viscosity (typically greater than about 0.1 Pa s at 20° C.—e.g., greater than about 1 Pa s at 20° C., greater than about 10 Pa s at 20° C., and in more-particular embodiments, greater than about 100 Pa s at 20° C.) to reduce the likelihood of 2-D-material-coating-solution migration due to non-wetting forces following metering of the solution onto the pore-filled substrate.

Use of Surfactant

In some exemplifications, it is advantageous to employ a surfactant to improve the wettability of the 2-D-material-coating solution upon the surface of the pore-filled substrate 5. In one embodiment, in which a hydrophobic pore-filling agent 8 and an aqueous 2-D-material coating-solution are employed, the surfactant reduces the interfacial surface tension between the two liquids and prevents the 2-D material coating solution from undesirably beading up on the surface of the pore-filled substrate 5.

Practical examples of surfactants for improving wettability can include non-ionic surfactants, such as poloxamers [e.g., poly(ethylene glycol)-block-poly(propylene glycol)-block-poly(ethylene glycol), sold under the PLURONIC trade name (from BASF of Ludwigshafen, Germany); other polyethylene oxide-based surfactants, sold under the TRITON (from Dow Chemical Company of Midland, Michigan, USA) and IGEPAL (from Solvay of Brussels, Belgium) trade names; lauric acid-based surfactants, such as glycerol monolaurate, sorbitan monolaurate, and polysorbate 20; stearic-acid-based surfactants, such as sorbitan tristearate and polysorbate 60; palmitic-acid-based surfactants, such as polysorbate 40, polyetheramines, sold under the JEFFAMINE trade name (from Huntsman Corporation of The Woodlands, Texas, USA), and the like; anionic surfactants, such as ammonium lauryl sulfate, sodium lauryl sulfate, sodium lauryl ether sulfate, sodium myreth sulfate, sodium octyl sulfate, sodium lauryl sarcosinate, sodium 2-ethylhexyl sulfate, and the like; cationic surfactants, such as cetyltrimethylammonium bromide, cetyltrimethylammonium chloride, myristyltrimethylammonium bromide, octadecyltrimethylammonium bromide, decyltrimethylammonium bromide, lauryltrimethylammonium bromide, didecyldimethylammonium chloride, cetylpyridinium chloride, 1-dodecylpyridinium chloride, benzalkonium chloride, benzethonium chloride, benzylhexadecyldimethylammonium chloride, benzyldimethyldodecylammonium bromide, and the like; zwitterionic surfactants, such as cocamidopropyl hydroxysultaine, trimethylglycine, lauryl sulfobetaine, myristyl sulfobetaine, caprylyl sulfobetaine, palmityl sulfobetaine, and the like; or mixtures thereof.

The surfactant can be applied to the pore-filled substrate 5 by depositing a surfactant-coating solution upon the surface of the pore-filled substrate 5 at a prescribed surfactant-coating-solution thickness, followed by evaporation of the surfactant-coating-solution solvent. The film thickness of the surfactant-coating solution is typically less than about 100 microns—e.g., less than about 60 microns, less than about 40 microns, less than about 25 microns, less than about 15 microns and, in more-particular embodiments, down to as low as about 5 microns.

Application of the surfactant-coating solution to the surface of the pore-filled substrate 5 can be accomplished through a variety of deposition methods, including dip coating, spray coating, gravure coating, slot-die coating, Mayer-rod coating, reverse-roll coating, and knife-over-roll coating, among others.

The surfactant-coating-solution solvent is advantageously a liquid in which the surfactant readily dissolves. The solvent may comprise water, alcohols, alkanes, aromatics, ethers, aldehydes, ketones, other organic compounds, and mixtures thereof. The solids content of the surfactant-coating solution may be less than about 5.0 mass percent—e.g., less than about 2 mass percent, less than about 1 mass percent, and, in more-particular embodiments, less than 0.5 mass percent.

The surfactant coating solution readily wets the surface of the pore-filled substrate in order to provide a continuous layer of the surfactant coating solution upon the surface of the pore-filled substrate. Wettability is governed by the surface tension of the pore-filling agent, the surface tension of the surfactant coating solution, and the effect that the surfactant has on the interfacial tension between the pore-filling agent and the solution.

Removal of the Pore-Filling Agent

Following deposition of the selective-transport layer 2 onto the pore-filled substrate 5, the pore-filling agent 8 (and surfactant, if present) is removed from the membrane in order to reduce the transport resistance of permeable components through the membrane. The pore-filling agent 8 (and surfactant, if present) can be removed by evaporation, freeze-drying, or thermal decomposition, among other methods. With each method, the pore-filling agent (and surfactant, if present) are removed from the membrane structure without disrupting the integrity of the selective-transport layer 2 on the surface of the fibers 4.

Alternatively, the pore-filling agent 8 (and surfactant, if present) can first be removed from the membrane via solvent extraction, followed by removal of the extraction solvent by evaporation, freeze-drying, or thermal decomposition, among other methods. The extraction solvent should possess good solvation properties for the pore-filling agent 8 (and surfactant, if present), possess poor solvation properties for the selective-transport layer 2 and fibers 4, and possess a high vapor pressure to facilitate subsequent solvent removal. The solvent may comprise an alcohol, alkane, aromatic, ether, aldehyde, ketone, another organic compound, and mixtures thereof.

Modification of Surface Charge of Pore Surfaces

The selective-transport layer 2 can alternatively be formed by depositing a 2-D-material-coating solution upon the surface of a low-cost, macroporous substrate 3, wherein the substrate 3 comprises fibers 4 and is highly porous with numerous large pores 6, and wherein the surface or diffuse layer charge of the fibers 4 is modified to be the opposite of the surface or diffuse layer charge of the 2-D materials in solution. Without wishing to be bound by any particular theory, it appears that the colloidal stability of the 2-D-material flakes within the 2-D-material-coating solution that are in closest proximity to the charged fiber surface is disrupted by the fiber surface charge or fiber diffuse layer charge, resulting in rapid aggregation of 2-D-material flakes at the wetted surface of the macroporous substrate 3. The aggregation appears to occur quickly enough that the 2-D-material flakes do not have time to penetrate into the pores of the macroporous substrate 3 and instead form a continuous film that spans the pores at the surface of the macroporous substrate 3.

Modification of the surface or diffuse layer charge of the macroporous substrate 3 comprising fibers 4 can be accomplished by depositing oppositely charged species upon the surface of the fibers 4. For instance, if the fibers 4 include negatively ionized or readily ionizable groups, the deposition of positively charged cationic species will modify the surface or diffuse layer charge of the macroporous substrate 3. Practical examples of cationic species that can be used to modify the surface or diffuse layer charge of a negatively charged macroporous substrate 3 can include inorganic salts, including divalent, trivalent, tetravalent, and/or hexavalent cations, such as $Mg^{2+}$, $Ca^{2+}$, $Sr^{2+}$, $Ba^{2+}$, $Zn^{2+}$, $Co^{2+}$, $Ni^{2+}$, $Cu^{2+}$, $Y^{3+}$, $La^{3+}$, $Al^{3+}$, $Ga^{3+}$, $Sb^{3+}$, $Bi^{3+}$, $Sn^{4+}$, $Ce^{4+}$, $Mo_7O_{24}^{6-}$, etc., and the like; organic salts, including cations, such as cetyltrimethylammonium, myristyltrimethylammonium, octadecyltrimethylammonium, decyltrimethylammonium, lauryltrimethylammonium, didecyldimethylammonium, cetylpyridinium, 1-dodecylpyridinium, benzalkonium, benzethonium, benzylhexadecyldimethylammonium, benzyldimethyldodecylammonium, tetramethylammonium, tetraethylammonium, tetrapropylammonium, tetrabutylammonium, and the like; polycationic salts, including polycations, such as poly(diallyldimethylammonium), poly(vinylbenzyltrimethylammonium), poly(acryloxyethyltrimethyl ammonium), poly(methacryloxy(2-hydroxy)propyltrimethyl ammonium), poly(N-methylvinylpyridinium), poly(allylamine hydrochloride) (PAH), polyethyleneimine (PEI), and the like; or mixtures thereof. The choice of anionic species to be paired with these cations may be less important. For example, the cations in the above-listed organic and polycationic salts can be paired with any of a variety of suitable anions, such as chloride, bromide, iodide, nitrate, hydroxide, acetate, bicarbonate, etc., ions. Similarly, the above-listed inorganic cations can be paired with any of a variety of suitable anions, such as bromide, chloride, iodide, nitrate, hydroxide, acetate, bicarbonate, nitrite, citrate, formate, fumarate, gluconate, lactate, propionate, sulfate, etc., ions.

Alternatively, if the fibers 4 include positively ionized or readily ionizable groups, the deposition of negatively charged anionic species will modify the surface or diffuse layer charge of the macroporous substrate 3. Practical examples of anionic species that can be used to modify the surface or diffuse layer charge of a positively charged macroporous substrate 3 can include inorganic salts, including multiple-valent anions, such as chromates, phosphates, sulfates, sulfites, thiosulfates, silicates, and the like; organic salts, including anions, such as carbonates, oxalates, tartrates, and the like; polyanionic salts, including polyanions, such as poly(styrenesulfonate), poly(2-acrylamido-2-methyl-1-propane sulfonate), poly(vinylsulfonate), sulfonated poly(ether ether ketone), poly(ethylenesulfonate), poly(methacryloxyethylsulfonate), poly(acrylate), poly(methacrylate), and the like; or mixtures thereof. The choice of cationic species to be paired with these anions may be less important. For example, the anions in the above-listed salts can be paired with any of a variety of suitable cations, such as $H^+$, $NH_4^+$, $Li^+$, $Na^+$, $K^+$, etc., ions.

The salts can be applied to the fibers 4 by wetting the macroporous substrate 3 with a salt solution, followed by evaporation of the salt-solution solvent. Application of the salt solution to the macroporous substrate 3 can be accomplished via any of a variety of deposition methods, including dip coating, spray coating, gravure coating, slot-die coating, Mayer-rod coating, reverse-roll coating, and knife-over-roll coating, among others.

Adhesion of the selective-transport layer 2 to the fibers 4 can also be improved by modifying the surface charge of the macroporous substrate 3, as the oppositely charged species deposited upon the surface of the fibers 4 can act as ionic linkers that bond the selective-transport layer 2 to the fibers 4.

Figure 5:
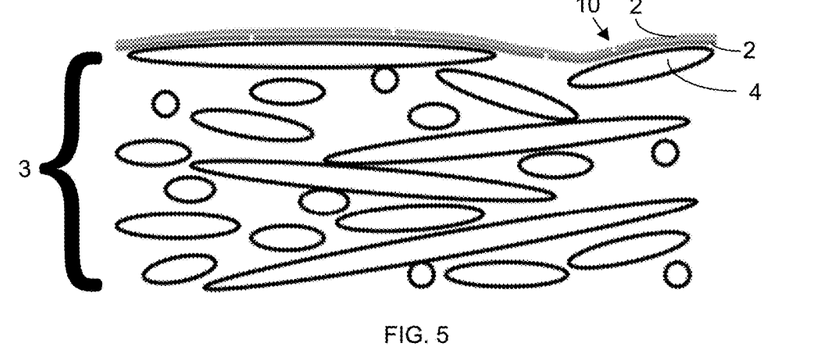
FIG. 5 is a side sectional view of an exemplification of the membrane structure.

FIG. 5 shows a side sectional view of another exemplification of the membrane structure. A multilayered selective-transport-layer structure comprising a plurality of stacked selective-transport layers 2 can be formed by depositing a 2-D material coating solution upon the surface of the porous (or surface-charge-modified) substrate 3 at a prescribed coating-solution thickness, followed by evaporation of the coating-solution solvent, followed by additional 2-D-material-coating-deposition and solvent-removal steps. Any defects 10 (shown as the gaps in the selective-transport layers 2) present in the first selective-transport layer 2 can be covered by subsequent selective-transport layers 2, thereby improving membrane integrity and reducing the leakage of undesired species across the membrane. The membrane structure typically comprises about one to five selective-transport layers 2 and can be about one to three selective-transport layers 2 or, more specifically, about one to two selective-transport layers 2. It is advantageous to use as few selective-transport layers 2 as possible while still retaining desired membrane-selectivity properties in order to minimize the resistance of the membrane to vapor permeation and to minimize the time and steps required to prepare the membrane.

Pore-filling agent 8, when used (and surfactant, if present, or surface-charge modifier), can be removed from the multilayered-membrane structure following any one of the sequential 2-D-material-coating-deposition and solvent-removal steps. For example, the pore-filling agent 8 (and surfactant, if present, or surface-charge modifier) can be removed following the first 2-D-material-coating-deposition and solvent-removal step, but prior to the second 2-D-material-coating-deposition and solvent-removal step. In the event that pore-filling agent 8 (and surfactant, if present, or surface-charge modifier) removal disrupts the selective-transport layer 2 and creates small defects through which undesired species transport may occur, the deposition of additional 2-D-material layers following removal of the pore-filling agent 8 (and surfactant, if present, or surface-charge modifier) may result in improved membrane integrity.

The selective-transport layer 2 tensile strength, abrasion resistance, and transport properties can be improved by crosslinking adjacent 2-D-material flakes to one another. The crosslinking agent can be incorporated into the 2-D-material-flake structure before or after 2-D-material-coating deposition, but the crosslinking process will generally take place following 2-D-material-coating-solution deposition in order to avoid excessive aggregation of the 2-D-material flakes in solution prior to orderly layered deposition on the macroporous substrate 3. The crosslinking process may be initiated upon contact of the crosslinking agent with 2-D-material flakes, or upon exposure of the crosslinking-agent-containing selective-transport layer to crosslinking-reactioninitiating conditions, such as increased temperature, photolysis, sonication, or introduction of a chemical initiator.

The mechanisms through which 2-D-material flakes can be crosslinked to one another depend upon the type of 2-D material and the functional groups present on the surface of the 2-D-material flake. In the case of graphene oxide, the graphene-oxide surface includes a mixture of hydroxyl, carboxyl, and epoxy functional groups. Crosslinking agents that readily react with adjacent functional groups via condensation or nucleophilic substitution reactions can be used to covalently bond adjacent graphene-oxide (GO) sheets to one another. Suitable crosslinking agents for graphene oxide include diamines, acyl chlorides, diisocyanates, dialdehydes, dicarboxylic acids, polyallylamine, polyetheramine, polydopamine, and the like, or mixtures thereof. After infiltration of the crosslinking agent into the selective-transport layer, the membrane can be heated to 50° C. to 100° C. to promote the crosslinking reaction. A dicarboxylic acid, such as oxalic acid, propanedioic acid, hexanedioic acid, and the like, or mixtures thereof, can be introduced into the graphene-oxide coating solution prior to deposition on the macroporous support. After removal of the graphene-oxide-solution solvent, the membrane may be exposed to a catalyst and heated to 50° C. to 100° C. to promote the crosslinking reaction.

Metal cations can also act as ionic crosslinkers between adjacent 2-D-material flakes. The metal cations can be cations of elements selected from s-block metals, d-block-metals, p-block metals and f-block metals. The metal cations can be selected from $Mg^{2+}$, $Ca^{2+}$, $Sr^{2+}$, $Ba^{2+}$, $Zn^{2+}$, $Co^{2+}$, $Ni^{2+}$, $Cu^{2+}$, $Y^{3+}$, $La^{3+}$, $Al^{3+}$, $Ga^{3+}$, $Sb^{3+}$, $Bi^{3+}$, $Sn^{4+}$, $Ce^{4+}$, etc. The metal cations can be cations having a charge greater than or equal to 2.

The selective-transport layer 2 includes a relatively high mass percentage of 2-D materials. The mass percentage of 2-D material in the selective-transport layer 2 is typically greater than or equal to about 50%—e.g., greater than or equal to about 70%, greater than or equal to about 80%, greater than or equal to about 90%, greater than or equal to about 95%, greater than or equal to about 97%, and, in more-particular embodiments, greater than or equal to about 99%.

The 2-D material can also reduce membrane fouling due to biological film growth through antimicrobial action. Graphene oxide and several transition-metal chalcogenides have been shown to exhibit antimicrobial properties.

Figure 6:
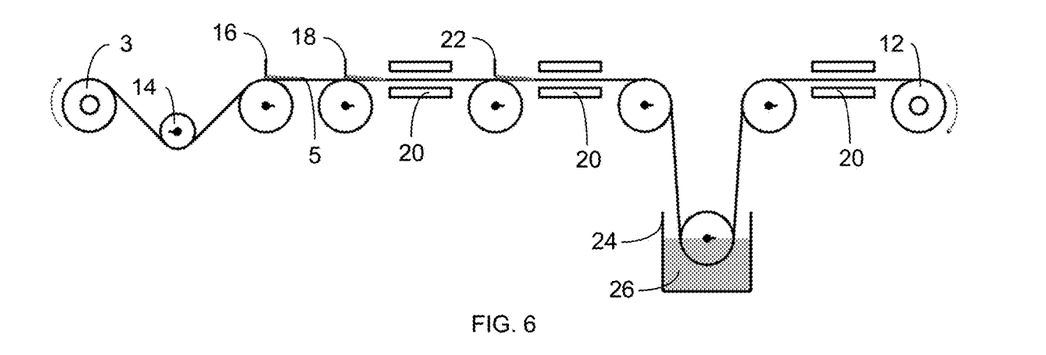
FIG. 6 is a side view illustrating a method of producing the membrane.

An exemplary process used to prepare the membrane employs common coating techniques that enable rapid, low-cost membrane production. FIG. 6 is a representation of a roll-to-roll process that can be employed to produce the vapor-permeable membrane 12. A fibrous support substrate 3 is conveyed across a series of rollers 14 and through a series of coating steps to yield the vapor-permeable membrane 12. A pore-filling agent is metered onto the support substrate 3 via a coating head 16, whereupon the pore-filling agent soaks into and fills the pores of the support substrate 3. A surfactant-coating solution is then metered onto the pore-filled support substrate 5 via a coating head 18 to a prescribed wet-film thickness. The pore-filled membrane substrate 5 is conveyed through a heater 20 to remove solvent from the wet-surfactant film. A 2-D-material-coating solution is then metered onto the pore-filled-membrane substrate 5 via a coating head 22 to a prescribed wet-film thickness. The pore-filled-membrane substrate 5 is conveyed through another heater 20 (or through the same heater used earlier in the process) to remove solvent from the wet 2-D-material film to produce the selective-transport layer on the pore-filled-membrane substrate 5. The membrane is then conveyed through a wash tank 24 to exchange the pore-filling agent with a more-volatile solvent 26. The membrane is then conveyed through a third heater 20 (or through the same heater used earlier in the process) to remove the more-volatile solvent from the support substrate. Following solvent evaporation, the vapor-permeable membrane 12 is produced.

Any coating methods capable of yielding a prescribed thickness of pore-filling agent, surfactant-coating solution, or 2-D-material solution on the surface of the fibrous support substrate 3 can be used to apply the pore-filling agent, surfactant-coating solution, or 2-D-material solution. These methods include spray coating, gravure coating, dip coating, reverse-roll coating, knife coating, slot-die coating, and Mayer-rod coating. The film thickness of the pore-filling agent prior to penetration into the fibrous support substrate 3 is typically about 20 to 250 microns—e.g., about 40 to 150 microns, and in more-particular embodiments, about 50 to 100 microns. The film thickness of the surfactant-coating solution is typically less than about 100 microns—e.g., less than about 60 microns, less than about 40 microns, less than about 25 microns, less than about 15 microns, and in more-particular embodiments, as low as about 5 microns. The film thickness of the 2-D-material-coating solution is typically less than about 100 microns—e.g., less than about 60 microns, less than about 40 microns, less than about 25 microns, less than about 15 microns, and, in more-particular embodiments, as low as about 5 microns.

Figure 7:
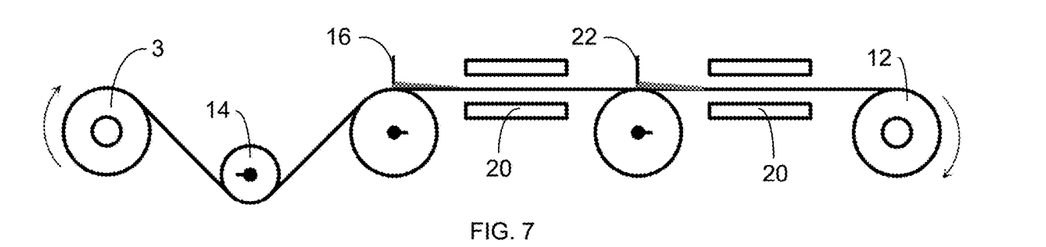
FIG. 7 is a side view illustrating a method of producing the membrane.

An additional exemplary process used to prepare the membrane 12 without the use of a pore-filling agent 8 is shown in FIG. 7. A fibrous support substrate 3 is conveyed across a series of rollers 14 and through a series of coating steps to yield the vapor-permeable membrane 12. A surface-charge-modifier solution is metered onto the support substrate 3 via a coating head 16, whereupon the surface-charge-modifier solution coats the pores of the support substrate 3. The membrane substrate is conveyed through a heater 20 to remove solvent from the wet-membrane substrate. A 2-D-material-coating solution is then metered onto the membrane substrate via a coating head 22 to a prescribed wet-film thickness. The membrane substrate is conveyed through another (or the same) heater 20 to remove solvent from the wet 2-D-material film and to form the vapor-permeable membrane 12.

Any coating method capable of yielding a prescribed amount of surface-charge-modifier solution or a prescribed thickness of 2-D-material solution on the surface of the fibrous support substrate 3 can be used to apply the surface-charge-modifier solution or the 2-D-material solution. These methods include spray coating, gravure coating, dip coating, reverse-roll coating, knife coating, slot-die coating, and Mayer-rod coating. The film thicknesses of the surface-charge-modifier solution and the 2-D-material-coating solution are typically less than about 100 microns—e.g., less than about 60 microns, less than about 40 microns, less than about 25 microns, less than about 15 microns, and, in more-particular embodiments, down to as low as about 5 microns.

The process used to prepare the vapor-permeable membrane 12 lends itself to high-speed production. The vapor-permeable membrane 12 is typically conveyed through the coating process at a speed of about 1 to 200 m/min—e.g., at a speed of about 10 to 150 m/min, and, in more-particular exemplifications, at a speed of about 20 to 100 m/min or at a speed of about 30 to 70 m/min.

Figure 8:
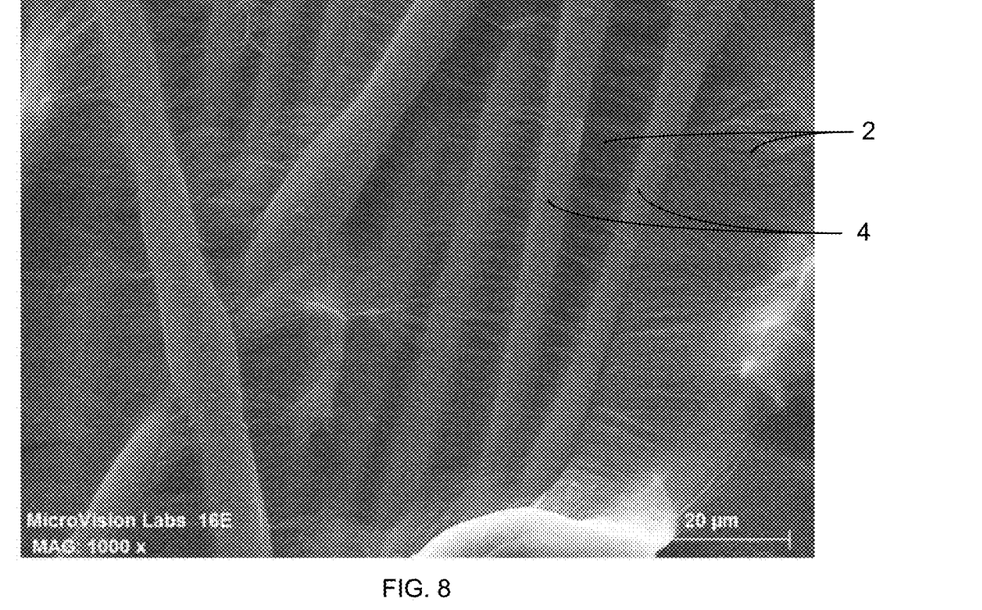
FIG. 8 is a magnified photographic image of an exemplification of the membrane microstructure.

FIG. 8 represents an image of the surface of an exemplification of the vapor-permeable membrane. Visible in the image are a thin film of 2-D material serving as the selective-transport layer 2 draped over non-woven support fibers 4 and spanning pores (i.e., volumes between the fibers 4) with large dimensions (>20 microns) within the substrate.

Figure 9:
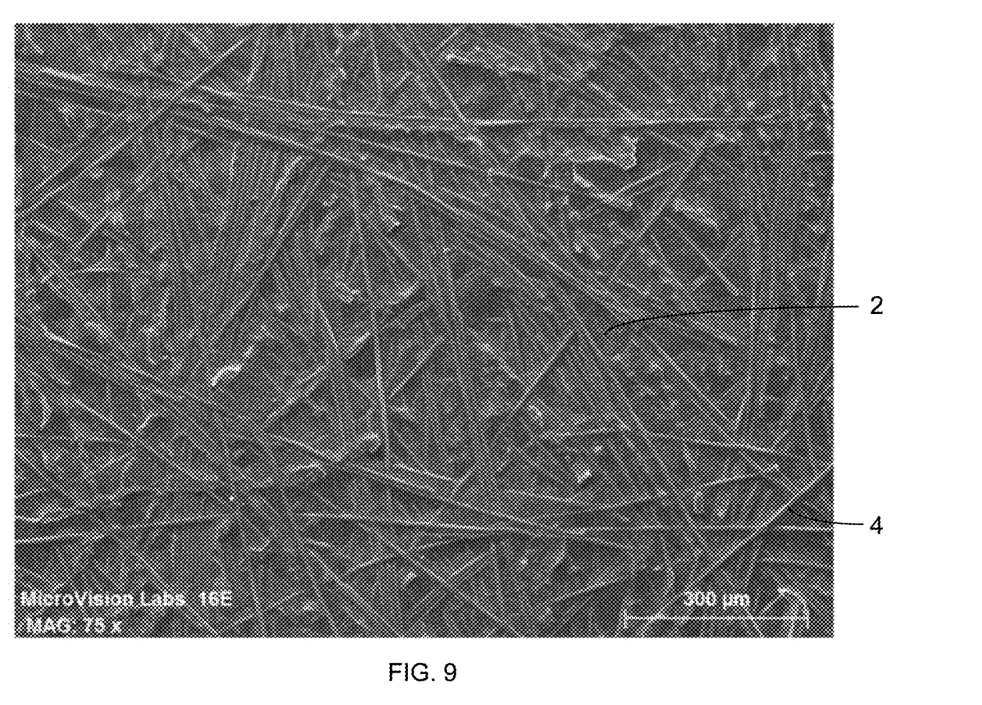
FIG. 9 is a magnified photographic image of an exemplification of the membrane microstructure.

FIG. 9 represents an image of a larger section of the surface of an exemplification of the vapor-permeable membrane. Visible in the image are a thin film of 2-D material serving as the selective-transport layer 2 draped over non-woven support fibers 4 and spanning large (>50 micron) pores within the substrate. No large gaps are visible in the 2-D-material film that serves as the selective-transport layer 2.

Figure 10:
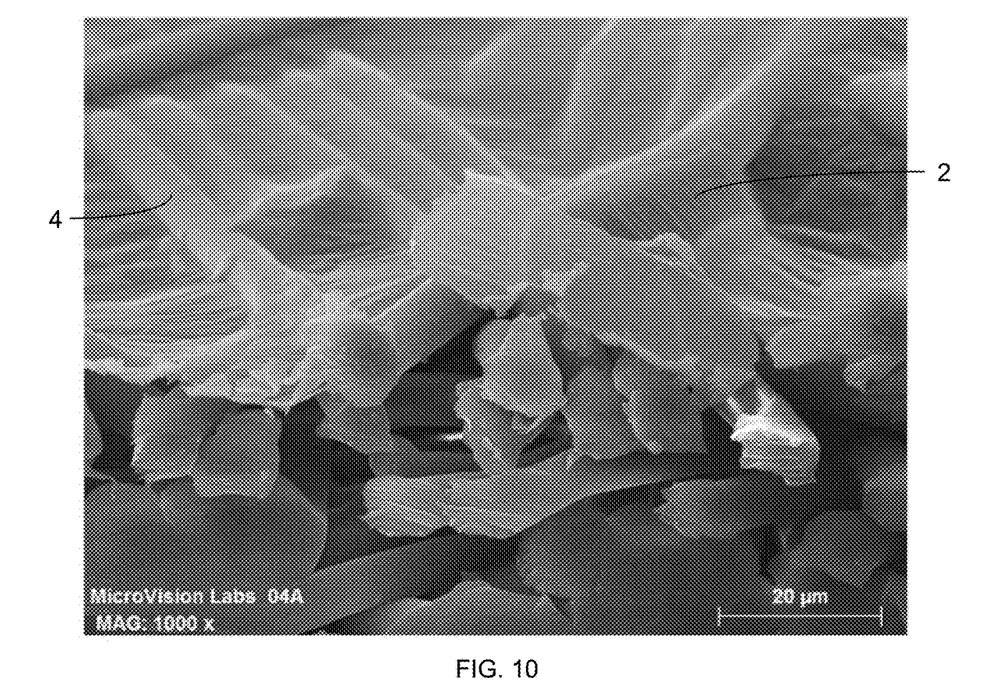
FIG. 10 is a magnified photographic image of an exemplification of the membrane microstructure.
Figure 11:
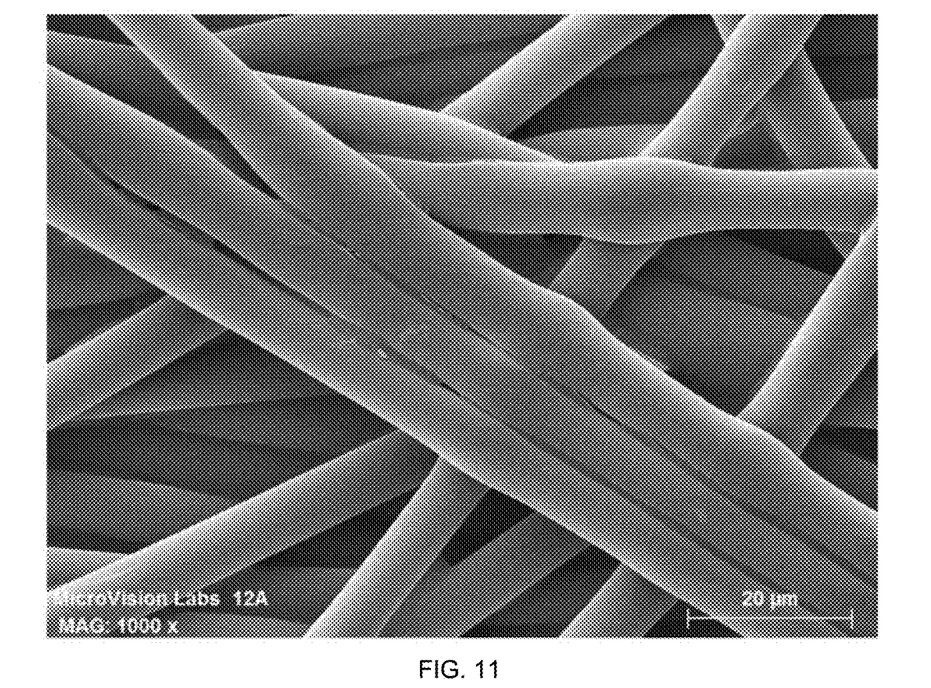
FIG. 11 is a magnified photographic image of another exemplification of membrane microstructure.

FIG. 10 represents an image of a cleaved vapor-permeable membrane in cross-section. Visible in the image are a thin film of 2-D material serving as the selective-transport layer 2 draped over non-woven support fibers 4 and spanning large (>10 micron) pores within the substrate.

The following examples illustrate formulations of the inventive membrane and methods of synthesizing and using the membrane.

EXEMPLIFICATIONS

Example 1

A non-woven-polyester substrate with a basis weight of 60 g/m$^2$ (from Hirose Paper Mfg Co. of Takaoka-cho, Tosa-shi, Kochi, Japan) was impregnated with a pore-filling agent—in this case, hexadecane (from Sigma-Aldrich of St. Louis, Missouri, USA); and excess hexadecane was removed from the surface of the substrate using a 2.5-mil Mayer rod at a coating speed of 10 m/min. A 23-micron-thick film of 1.0-wt % single-layer graphene oxide (from ACS Material, LLC, of Medford, Massachusetts, USA and from which the selective-transport layer is formed) in water was deposited on the substrate using a 9-mil Mayer rod at a coating speed of 10 m/min. Following drying at 20° C. for five minutes, the membrane was immersed in ethanol (from Sigma-Aldrich) for two minutes and then dried at 20° C. for five minutes.

Example 2

A non-woven-polyester substrate with a basis weight of 60 g/m$^2$ (from Hirose Paper Mfg Co.) was impregnated with hexadecane (from Sigma-Aldrich) as the pore-filling agent, and excess hexadecane was removed from the surface of the substrate using a 2.5-mil Mayer rod at a coating speed of 10 m/min. A 23-micron-thick film of 0.5-wt % hexadecyltrimethylammonium bromide surfactant (from Sigma-Aldrich) in water was deposited on the hexadecane-filled substrate using a 9-mil Mayer rod at a coating speed of 10 m/min. Following drying at 20° C. for five minutes, a 23-micron-thick film of 1.0-wt % single-layer graphene oxide (from ACS Material, LLC, and from which the selective-transport layer is formed) in water was deposited on the substrate using a 9-mil Mayer rod at a coating speed of 10 m/min. Following drying at 20° C. for 5 minutes, the membrane was immersed in ethanol (from Sigma-Aldrich) for two minutes and then dried at 20° C. for five minutes.

Example 3

A non-woven-polyester substrate with a basis weight of 60 g/m$^2$ (from Hirose Paper Mfg Co.) was impregnated with hexadecane pore-filling agent (from Sigma-Aldrich) and excess hexadecane was removed from the surface of the substrate using a 2.5-mil Mayer rod at a coating speed of 10 m/min. A 23-micron-thick film of 0.5-wt % hexadecyltrimethylammonium bromide surfactant (from Sigma-Aldrich) in water was deposited on the hexadecane-filled substrate using a 9-mil Mayer rod at a coating speed of 10 m/min. Following drying at 20° C. for five minutes, a 23-micron-thick film of 0.5-wt % single-layer graphene oxide (from ACS Material, LLC) in water was deposited on the substrate using a 9-mil Mayer rod at a coating speed of 10 m/min. Following drying at 20° C. for five minutes, a second 23-micron-thick film of 0.5-wt % single-layer graphene oxide in water was deposited on the substrate using a 9-mil Mayer rod at a coating speed of 10 m/min. Following drying at 20° C. for five minutes to form the selective-transport layer from the deposited graphene oxide, the membrane was immersed in ethanol (from Sigma-Aldrich) for two minutes to remove the surfactant and then dried at 20° C. for five minutes.

Example 4

A 23-micron-thick film of 0.5-wt % tetradecyltrimethylammonium bromide (from Sigma-Aldrich and providing the cationic species, tetradecyltrimethylammonium) in water was deposited on a non-woven polyester substrate with a basis weight of 60 g/m$^2$ (from Hirose Paper Mfg Co.) using a 9-mil Mayer rod at a coating speed of 10 m/min. Following drying at 20° C. for five minutes, a 23-micron-thick film of 0.8-wt % single-layer graphene oxide (from ACS Material, LLC) in water was deposited on the substrate using a 9-mil Mayer rod at a coating speed of 10 m/min. Following drying at 20° C. for five minutes, a second 23-micron-thick film of 0.8-wt % single-layer graphene oxide in water was deposited on the membrane using a 9-mil Mayer rod at a coating speed of 10 m/min. Following drying at 20° C. for five minutes to form the selective-transport layer from the deposited graphene oxide, the membrane was immersed in ethanol (from Sigma-Aldrich) for two minutes to remove the surfactant and then dried at 20° C. for five minutes.

Example 5

A 23-micron-thick film of 0.5-wt % polyethyleneimine (from Sigma-Aldrich and providing the polycationic species polyethyleneimine) in water was deposited on a non-woven-polyester substrate with a basis weight of 60 g/m$^2$ (from Hirose Paper Mfg Co.) using a 9-mil Mayer rod at a coating speed of 10 m/min. Following drying at 20° C. for five minutes, a 23-micron-thick film of 0.8-wt % single-layer graphene oxide (from ACS Material, LLC) in water was deposited on the substrate using a 9-mil Mayer rod at a coating speed of 10 m/min. Following drying at 20° C. for five minutes, a second 23-micron-thick film of 0.8-wt % single-layer graphene oxide in water was deposited on the substrate using a 9-mil Mayer rod at a coating speed of 10 m/min. Following drying at 20° C. for five minutes to form the selective-transport layer from the deposited graphene oxide, the membrane was immersed in ethanol (from Sigma-Aldrich) for two minutes to remove the cationic species and then dried at 20° C. for five minutes.

Example 6

A 23-micron-thick film of 0.5-wt % poly(sodium 4-styrenesulfonate) (from Sigma-Aldrich and providing the polyanionic species poly(styrenesulfonate)) in water was deposited on a non-woven-polyester substrate with a basis weight of 48 g/m² (from Hirose Paper Mfg Co.) using a 9-mil Mayer rod at a coating speed of 10 m/min. Following drying at 20° C. for five minutes, a 23-micron-thick film of 0.8-wt % single-layer graphene oxide (from ACS Material, LLC) in water was deposited on the substrate using a 9-mil Mayer rod at a coating speed of 10 m/min. Following drying at 20° C. for five minutes, a second 23-micron-thick film of 0.8-wt % single-layer graphene oxide in water was deposited on the substrate using a 9-mil Mayer rod at a coating speed of 10 m/min. Following drying at 20° C. for five minutes, the membrane was immersed in ethanol (from Sigma-Aldrich) for two minutes to remove the anionic species and then dried at 20° C. for five minutes. The high leak rate of the membrane (see Example 16) indicates that a selective-transport layer was not formed.

Example 7

A 23-micron-thick film of 0.5-wt % calcium chloride (from Sigma-Aldrich and providing the cationic species, $Ca^{2+}$) in water was deposited on a non-woven-polyester substrate with a basis weight of 60 g/m² (from Hirose Paper Mfg Co.) using a 9-mil Mayer rod at a coating speed of 10 m/min. Following drying at 20° C. for five minutes, a 23-micron-thick film of 0.8-wt % single-layer graphene oxide (ACS Material, LLC, and from which the selective-transport layer is formed) in water was deposited on the substrate using a 9-mil Mayer rod at a coating speed of 10 m/min. Following drying at 20° C. for five minutes, a second 23-micron-thick film of 0.8-wt % single-layer graphene oxide in water was deposited on the substrate using a 9-mil Mayer rod at a coating speed of 10 m/min. Following drying at 20° C. for five minutes to form the selective-transport layer from the deposited graphene oxide, the membrane was immersed in ethanol (from Sigma-Aldrich) for two minutes to remove the cationic species and then dried at 20° C. for five minutes.

Example 8

A 23-micron-thick film of 0.25-wt % calcium chloride (from Sigma-Aldrich and providing the cationic species, $Ca^{2+}$) in water was deposited on a non-woven-polyester substrate with a basis weight of 60 g/m² (from Hirose Paper Mfg Co.) using a 9-mil Mayer rod at a coating speed of 10 m/min. Following drying at 20° C. for five minutes, a 23-micron-thick film of 0.8-wt % single-layer graphene oxide (ACS Material, LLC, and from which the selective-transport layer is formed) in water was deposited on the substrate using a 9-mil Mayer rod at a coating speed of 10 m/min. Following drying at 20° C. for five minutes, a second 23-micron-thick film of 0.8-wt % single-layer graphene oxide in water was deposited on the substrate using a 9-mil Mayer rod at a coating speed of 10 m/min. The membrane was dried at 20° C. for five minutes to form the selective-transport layer from the deposited graphene oxide.

Example 9

A 23-micron-thick film of 0.50-wt % magnesium chloride (from Sigma-Aldrich and providing the cationic species, $Mg^{2+}$) in water was deposited on a non-woven-polyester substrate with a basis weight of 60 g/m² (from Hirose Paper Mfg Co.) using a 9-mil Mayer rod at a coating speed of 10 m/min. Following drying at 20° C. for five minutes, a 23-micron-thick film of 0.8-wt % single-layer graphene oxide (ACS Material, LLC, and from which the selective-transport layer is formed) in water was deposited on the substrate using a 9-mil Mayer rod at a coating speed of 10 m/min. Following drying at 20° C. for five minutes, a second 23-micron-thick film of 0.8-wt % single-layer graphene oxide in water was deposited on the substrate using a 9-mil Mayer rod at a coating speed of 10 m/min. The membrane was dried at 20° C. for five minutes to form the selective-transport layer from the deposited graphene oxide.

Example 10

A 23-micron-thick film of 0.5-wt % tetradecyltrimethyl-ammonium bromide (from Sigma-Aldrich and providing the cationic species, tetradecyltrimethylammonium) in water was deposited on a non-woven-polyester substrate with a basis weight of 48 g/m² (from Hirose Paper Mfg Co.) using a 9-mil Mayer rod at a coating speed of 10 m/min. Following drying at 20° C. for five minutes, a 23-micron-thick film of 0.64-wt % single-layer graphene oxide (from ACS Material, LLC, and with a flake size of 0.5 to 2 micron) in water was deposited on the substrate using a 9-mil Mayer rod at a coating speed of 10 m/min. Following drying at 20° C. for five minutes, a second 23-micron-thick film of 0.64-wt % single-layer graphene oxide in water was deposited on the substrate using a 9-mil Mayer rod at a coating speed of 10 m/min. Following drying at 20° C. for five minutes to form the selective-transport layer from the deposited graphene oxide, the membrane was immersed in ethanol (from Sigma-Aldrich) for two minutes to remove the cationic species and then dried at 20° C. for five minutes.

Example 11

A 1.0-wt % dispersion of single-layer graphene oxide (from ACS Materials and with a flake size of 0.5 to 2 microns) in water was centrifuged at 5,000 rpm for 60 minutes, and the supernatant was collected. The collected supernatant was centrifuged at 5,000 rpm for an additional 90 minutes, and the supernatant was collected. The graphene-oxide concentration of the twice-centrifuged supernatant was 0.64 wt %.

A 23-micron-thick film of 0.5-wt % tetradecyltrimethyl-ammonium bromide (from Sigma-Aldrich and providing the cationic species, tetradecyltrimethylammonium) in water was deposited on a non-woven-polyester substrate with a basis weight of 48 g/m² (from Hirose Paper Mfg Co.) using a 9-mil Mayer rod at a coating speed of 10 m/min. Following drying at 20° C. for five minutes, a 23-micron-thick film of the 0.64-wt % twice-centrifuged single-layer graphene oxide in water was deposited on the substrate using a 9-mil Mayer rod at a coating speed of 10 m/min. Following drying at 20° C. for five minutes, a second 23-micron-thick film of the 0.64-wt % twice-centrifuged single-layer graphene oxide in water was deposited on the substrate using a 9-mil Mayer rod at a coating speed of 10 m/min. Following drying at 20° C. for five minutes to form the selective-transport layer from the deposited graphene oxide, the membrane was immersed in ethanol (from Sigma-Aldrich) for two minutes to remove the cationic species and then dried at 20° C. for five minutes.

The membrane prepared from the twice-centrifuged supernatant graphene-oxide solution (Example 9) exhibited a higher water permeance and a lower leak rate (see Example 16) than the membrane prepared from the uncentrifuged graphene oxide solution (Example 10).

Example 12

18 ml/min of 0.5-wt % tetradecyltrimethylammonium bromide (from Sigma-Aldrich and providing the cationic species, tetradecyltrimethylammonium) in water was deposited on a non-woven-polyester substrate with a basis weight of 60 g/m² (from Hirose Paper Mfg Co.) using a 6-inch-wide slot-die coating head at a coating speed of 2 m/min. Following drying at 50° C. for three minutes, 12 ml/min of 1.0-wt % single-layer graphene oxide (from ACS Material, LLC) in water was deposited on the substrate using a 6-inch-wide slot-die coating head at a coating speed of 2 m/min. Following drying at 50° C. for three minutes, another application of 12 ml/min 1.0-wt % single-layer graphene oxide in water was deposited on the substrate using a 6-inch-wide slot-die coating head at a coating speed of 2 m/min. Following drying at 50° C. for three minutes to form the selective-transport layer from the deposited graphene oxide, the membrane was immersed in ethanol (from Sigma-Aldrich) for two minutes to remove the surfactant and then dried at 20° C. for five minutes.

Example 13

A 23-micron-thick film of 1.0-wt % single-layer graphene oxide (from ACS Material, LLC) in water was deposited on a non-woven polyester substrate with a basis weight of 60 g/m² (from Hirose Paper Mfg Co.) using a 9-mil Mayer rod at a coating speed of 10 m/min and dried at 20° C. for five minutes. FIG. 10 represents an image of the surface of the membrane. Visible in the image are deposits of graphene-oxide film upon the surface of the fibers 4 and in narrow (1 um) crevices between adjacent fibers 4. The high leak rate of the membrane (see Example 16) indicates that a selective-transport layer was not formed.

Example 14

A non-woven polyester substrate with a basis weight of 48 g/m (from Hirose Paper Mfg Co.) was punctured with a needle to form 350-micron-diameter holes in the substrate.

A 23-micron-thick film of 0.5-wt % tetradecyltrimethyl-ammonium bromide (from Sigma-Aldrich and providing the cationic species, tetradecyltrimethylammonium) in water was deposited on the punctured substrate using a 9-mil Mayer rod at a coating speed of 10 m/min. Following drying at 20° C. for five minutes, a 23-micron-thick film of 1.0-wt % single-layer graphene oxide (from ACS Material, LLC) in water was deposited on the membrane using a 9-mil Mayer rod at a coating speed of 10 m/min. Following drying at 20° C. for five minutes, a second 23-micron thick film of 1.0-wt % single-layer graphene oxide in water was deposited on the membrane using a 9-mil Mayer rod at a coating speed of 10 m/min. Following drying at 20° C. for five minutes, the membrane was immersed in ethanol (Sigma-Aldrich) for two minutes and then dried at 20° C. for five minutes.

Figure 12:
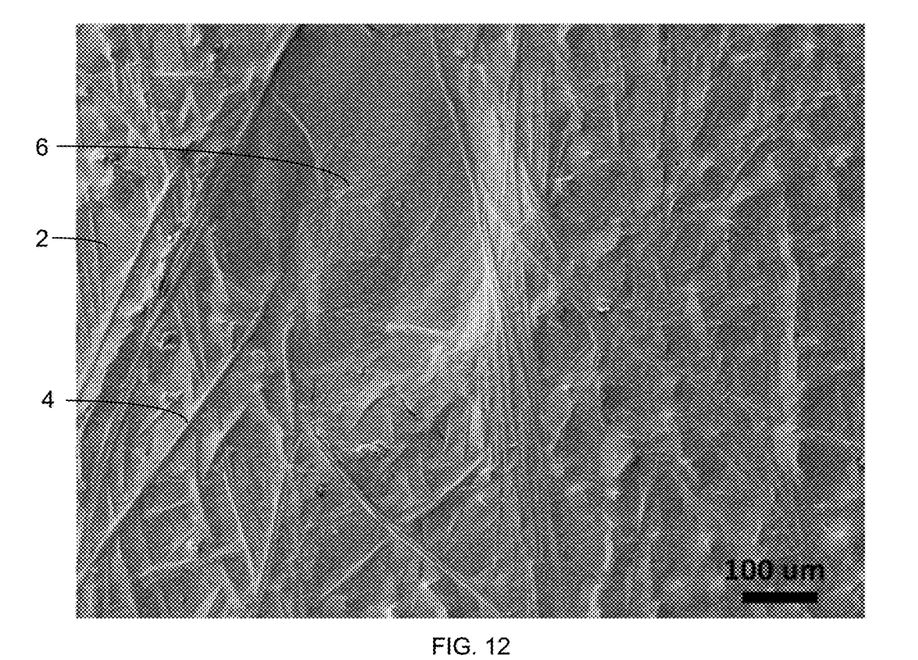
FIG. 12 is a magnified photographic image of another exemplification of membrane microstructure.

FIG. 12 represents an image of the surface of the membrane. Visible in the image are a continuous film of graphene oxide (serving as the selective transport layer 2) spanning a 350-um-diameter open pore 6 (beneath layer 2) in the substrate. The leak rate of the membrane prepared from the punctured substrate was similar to the leak rates of other membrane prepared with non-punctured substrate (see Example 16).

Example 15

In this example, a membrane with a graphene-oxide selective-transport layer is formed with a porous polymer [e.g., polyacrylonitrile (PAN)] support layer including micropores proximate its outer surface and positioned between the selective-transport layer and the non-woven substrate. The porous-polymer-support layer has an asymmetric pore structure that serves to reduce water permeance.

Figure 13:
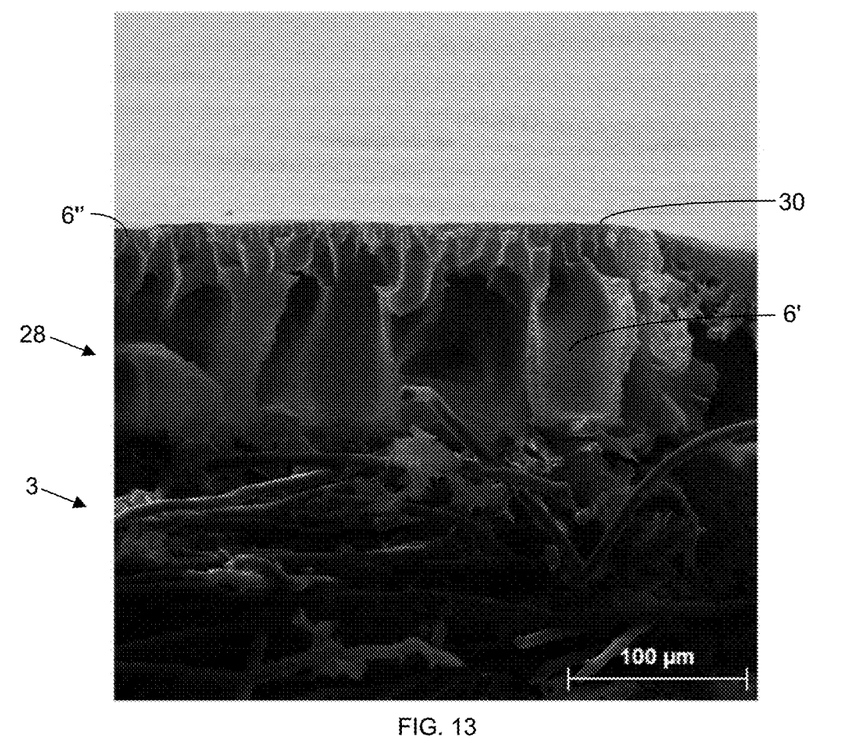
FIG. 13 is a magnified photographic image of another exemplification of membrane microstructure.
Figure 14:
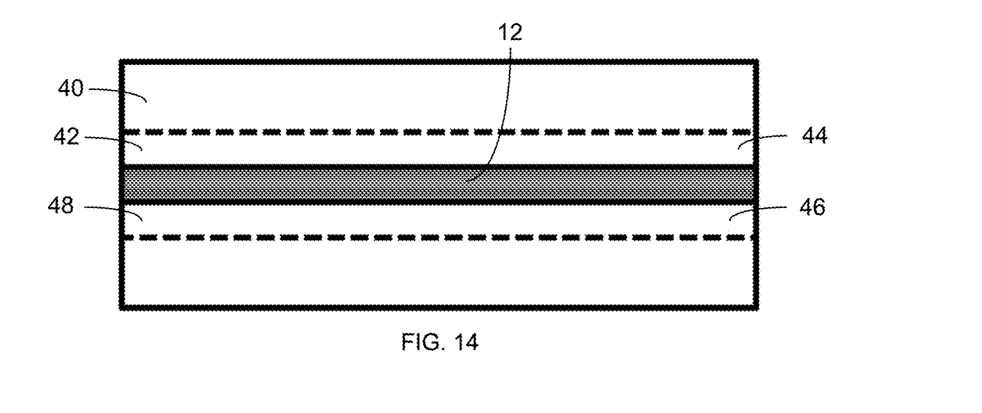
FIG. 14 is a sectional view of a flat sheet membrane holder.

In this example, the porous-polymer-support layer was formed by casting polyacrylonitrile on a non-woven-polyester-support substrate. A solution including 14-wt % poly (acrylonitrile-co-methyl acrylate) (from Scientific Polymer Products, Inc., of Ontario, NY, USA) in dimethylformamide was deposited on a non-woven-polyester-support substrate with a basis weight of 80 g/m² and metered to a thickness of 270 microns with a doctor blade. The non-woven-support substrate and wet film were immediately submerged in a 50° C. water bath for three minutes, followed by a 20° C. water bath for eight minutes, followed by air drying for one hour. FIG. 13 represents an image of the resulting structure in cross-section. Visible in the image are the non-woven support substrate 3, the porous-polymer-support layer 28, macropores 6' in the porous-polymer-support layer 28, micropores 6" in the porous-polymer-support layer 28, and the outer skin 30 of the porous-polymer-support layer 28.

A 23-micron-thick film of 0.8 wt % single-layer graphene oxide (ACS Material, LLC) in water was deposited on the porous-polymer-support layer 28 using a 9-mil Mayer rod at a coating speed of 10 m/min. Following drying at 20° C. for five minutes, a second 23-micron-thick film of 0.8-wt % single-layer graphene oxide (ACS Materials) in water was deposited on the membrane using a 9-mil Mayer rod at a coating speed of 10 m/min and at 20° C. for five minutes and dried to form the selective-transport layer of a vapor-permeable membrane. The water permeance of the PAN-containing membrane was lower than most of the other membranes (see Example 16).

Example 16

The membrane 12 was loaded into a flat-sheet membrane holder 40 (FIG. 14) equipped with a feed-stream inlet 42, feed-stream outlet 44, sweep-stream inlet 46, and sweep-stream outlet 48, leaving an exposed membrane area of 4.7 cm². The leak rate of the membrane was quantified by feeding up to 1,000 cubic centimeters per minute (cc/min) of air to the feed-stream inlet 42 and sealing the feed-stream outlet 44. The pressure of the air-feed stream was monitored until it stabilized. The leak rate was calculated as feed-stream air-flow rate/membrane area/feed-stream pressure. The water-vapor permeance of the membrane was quantified by feeding 500 cc/min of water-vapor-saturated air (at 20° C.) at up to 1 psig (6.9 kPa) to the feed-stream inlet 42 and up to 500 cc/min of dry argon (at 20° C.) at up to 1 psig (6.9 kPa) to the sweep-stream inlet 46. The flowrate, composition, and humidity of the streams exiting the feed-stream outlet 44 and the sweep-stream outlet 48 were measured. The water-vapor permeance of the membrane was calculated as the flux of water across the membrane (in mol/m²/s) divided by the average of the water partial pressure at the feed-stream inlet 42 minus the water partial pressure at the sweep-stream outlet 48, and the water partial pressure at the feed-stream outlet 44 minus the water partial pressure at the sweep-stream inlet 46. TABLE 1, below, summarizes the leak-rate and water-vapor-permeance data of several membranes.

TABLE 1

Membrane Leak Rate and Water Vapor Permeance

| Membrane | Leak Rate (cc/s/m$^2$/Pa) | Water Vapor Permeance (GPU) |
| --- | --- | --- |
| Example 1 | 0.076 | $2.08 \times 10^4$ |
| Example 2 | 0.160 | $2.76 \times 10^4$ |
| Example 3 | 0.147 | $3.06 \times 10^4$ |
| Example 4 | 0.010 | $2.66 \times 10^4$ |
| Example 5 | 0.093 | $9.60 \times 10^3$ |
| Example 6 | 34.3 | not measured |
| Example 7 | 0.381 | $2.76 \times 10^4$ |
| Example 8 | 0.140 | $2.24 \times 10^4$ |
| Example 9 | 0.126 | $2.33 \times 10^4$ |
| Example 10 | 0.032 | $1.40 \times 10^4$ |
| Example 11 | 0.009 | $1.81 \times 10^4$ |
| Example 12 | 0.120 | $2.56 \times 10^4$ |
| Example 13 | 120 | not measured |
| Example 14 | 0.450 | $3.20 \times 10^4$ |
| Example 15 | 0.114 | $1.88 \times 10^4$ |

Example 17

A 23-micron-thick film of 0.5-wt % tetradecyltrimethylammonium bromide (from Sigma-Aldrich and providing the cationic species, tetradecyltrimethylammonium) in water was deposited on a non-woven-polyester substrate with a basis weight of 36 g/m$^2$ (from Hirose Paper Mfg Co.) using a 9-mil Mayer rod at a coating speed of 10 m/min. Following drying at 20° C. for 5 minutes, a 23-micron-thick film of 1.0-wt % single-layer graphene oxide (from ACS Material, LLC) in water was deposited on the substrate using a 9-mil Mayer rod at a coating speed of 10 m/min. Following drying at 20° C. for five minutes, a second 23-micron-thick film of 1.0 wt % single-layer graphene oxide in water was deposited on the substrate using a 9-mil Mayer rod at a coating speed of 10 m/min. Following drying at 20° C. for five minutes to form the selective-transport layer from the deposited graphene oxide, the membrane was immersed in ethanol (from Sigma-Aldrich) for two minutes to remove the surfactant and then dried at 20° C. for five minutes.

The membrane was loaded into a flat-sheet membrane holder, and the water-vapor permeance of the membrane was quantified at water-saturated air and argon flow rates from 500 cc/min to 2,200 cc/min each. The measured water-vapor permeances are summarized in TABLE 2.

TABLE 2

| Gas Flowrate (cc/min) | Membrane Water Vapor Permeance (GPU) |
| --- | --- |
| 500 | $3.25 \times 10^4$ |
| 1,000 | $3.99 \times 10^4$ |
| 1,500 | $4.15 \times 10^4$ |
| 2,000 | $4.52 \times 10^4$ |
| 2,200 | $4.58 \times 10^4$ |

The use of the separation membrane in fluid-separation and transport processes can offer many advantages over the use of previously known membranes.

An advantage provided by embodiments of the membrane is that the membrane provides high water-vapor-transport rates (>$3.0 \times 10^4$ GPU) and very-low leak rates (<0.1 cc/s/m$^2$/Pa). These properties are beneficial in humidification and dehumidification applications, where increased permeation rates can improve device efficiency, reduce device size, and reduce device cost.

An advantage provided by embodiments of the membrane is that very thin (<1-μm thick) selective membrane films can be deposited directly upon macroporous substrates without the use of a microporous-support layer. Avoiding the use of a microporous-support layer reduces membrane-transport resistance and reduces membrane cost.

Another advantage provided by embodiments of the membrane is that 2-D-material films can be directly deposited from a 2-D material solution onto macroporous substrates possessing surface pore sizes much larger than the flake size of the 2-D material.

Yet another advantage provided by embodiments of the membrane is that the thickness of 2-D-material films can be much smaller than the surface pore size of the macroporous substrate upon which the film is supported.

In describing embodiments of the invention, specific terminology is used for the sake of clarity. For purposes of description, each specific term is intended to at least include all technical and functional equivalents that operate in a similar manner to accomplish a similar purpose. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Further, where parameters for various properties are specified herein for embodiments of the invention, those parameters can be adjusted up or down by $1/100^{th}$, $1/50^{th}$, $1/20^{th}$, $1/10^{th}$, $1/5^{th}$, $1/3^{rd}$, $1/2$, $2/3^{rd}$, $3/4^{th}$, $4/5^{th}$, $9/10^{th}$, $19/20^{th}$, $49/50^{th}$, $99/100^{th}$, etc. (or up by a factor of 1, 2, 3, 4, 5, 6, 8, 10, 20, 50, 100, etc.), or by rounded-off approximations thereof, unless otherwise specified. Moreover, while this invention has been shown and described with references to particular embodiments thereof, those skilled in the art will understand that various substitutions and alterations in form and details may be made therein without departing from the scope of the invention. Further still, other aspects, functions and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of all references, including reference texts, journal articles, patents, patent applications, etc., cited throughout this application are hereby incorporated by reference in their entirety. All appropriate combinations of embodiments, features, characterizations, components and methods of those references and the present disclosure may be selected for inclusion in embodiments of the invention. Still further, the components and methods identified in the Background section are integral to this disclosure and can be used in conjunction with or substituted for components and methods described elsewhere in the disclosure within the scope of the invention.

What is claimed is:

1. A method for fabricating a membrane, the method comprising:
    contacting a porous substrate that defines open surface pores with a liquid solution to fill or wet the open surface pores of the porous substrate, wherein the liquid solution comprises a solvent and a solute dissolved in the solvent; then
    removing the solvent from the liquid solution to modify the surface charge of the open surface pores with a solute from the liquid solution so as to produce open surface-modified pores with dimensions of at least about 2 microns; then depositing a 2-D-material-flake solution comprising 2-D-material flakes on the porous substrate with the open surface-modified pores and without a support layer between the otherwise open surface-modified pores of the porous substrate and the selective-transport layer to form a 2-D-material-flake-solution layer with a thickness of less than 40 microns, wherein the solute promotes aggregation of the 2-D-material flakes to inhibit penetration of the 2-D-material flakes into the otherwise open surface-modified pores; and then evaporating solvent from the 2-D-material-flake-solution layer to form a selective-transport layer comprising 2-D-material flakes on the porous substrate, wherein the selective-transport layer coats the porous substrate and spans across the otherwise open surface-modified pores.

2. The method of claim 1, the method further comprising removing the solute from the porous substrate after depositing the selective-transport layer on the porous substrate.

3. The method of claim 1, wherein the porous substrate comprises a fibrous substrate.

4. The method of claim 1, wherein the 2-D-material-flake solution comprises a composition selected from graphene, graphene oxide, silicene, 2-D silica, phosphorene, boron nitride, borocarbonitrides, transition-metal chalcogenides, MXenes, and mixtures thereof dissolved in water.

5. The method of claim 1, wherein the solute that modifies the surface charge of the open surface pores of the porous substrate comprises a composition selected from magnesium chloride, magnesium bromide, magnesium hydroxide, magnesium nitrite, magnesium nitrate, magnesium acetate, magnesium citrate, magnesium formate, magnesium fumarate, magnesium gluconate, magnesium lactate, magnesium propionate, magnesium sulfate, calcium chloride, calcium bromide, calcium hydroxide, calcium nitrite, calcium nitrate, calcium acetate, calcium citrate, calcium formate, calcium fumarate, calcium gluconate, calcium lactate, calcium propionate, calcium sulfate, strontium chloride, strontium bromide, strontium hydroxide, strontium nitrite, strontium nitrate, strontium acetate, strontium citrate, strontium formate, strontium fumarate, strontium gluconate, strontium lactate, strontium propionate, strontium sulfate, and mixtures thereof.

6. The method of claim 1, wherein the solute that modifies the surface charge of the open surface pores of the porous substrate comprises a composition selected from a salt with a cation selected from cetyltrimethylammonium, myristyltrimethylammonium, octadecyltrimethylammonium, decyltrimethylammonium, lauryltrimethylammonium, didecyldimethylammonium, cetylpyridinium, 1-dodecylpyridinium, benzalkonium, benzethonium, benzylhexadecyldimethylammonium, benzyldimethyldodecylammonium, tetramethylammonium, tetraethylammonium, tetrapropylammonium, and tetrabutylammonium; and a polycationic salt, selected from poly(diallyldimethylammonium chloride), poly(vinylbenzyltrimethylammonium chloride), poly(acryloxyethyltrimethyl ammonium chloride), poly(methacryloxy (2-hydroxy) propyltrimethyl ammonium chloride), poly(N-methylvinylpyridinium chloride), poly(allylamine hydrochloride), polyethyleneimine, and mixtures thereof.

* * * * *